US012752320B2

(12) United States Patent
Nicoletti

(10) Patent No.: US 12,752,320 B2
(45) Date of Patent: Oct. 6, 2026

(54) PROCESS FOR THE TREATMENT OF THE PHOTOPOLYMER MATERIAL THAT CONSTITUTES THE MATRIX PLATES IN FLEXOGRAPHIC PRINTING

(71) Applicant: Ira Nicoletti, Mira (IT)

(72) Inventor: Ira Nicoletti, Mira (IT)

( * ) Notice: Subject to any disclaimer, the term of this patent is extended or adjusted under 35 U.S.C. 154(b) by 640 days.

(21) Appl. No.: 18/223,206

(22) Filed: Jul. 18, 2023

(65) Prior Publication Data

US 2024/0024934 A1 Jan. 25, 2024

(51) Int. Cl.

| | |
|---|---|
| ***B09B 3/35*** | (2022.01) |
| ***B09B 3/24*** | (2022.01) |
| ***B09B 3/40*** | (2022.01) |
| *B09B 101/75* | (2022.01) |

(52) U.S. Cl.

CPC .................. *B09B 3/35* (2022.01); *B09B 3/24* (2022.01); *B09B 3/40* (2022.01); *B09B 2101/75* (2022.01)

(58) Field of Classification Search

USPC ............................................................ 521/40

See application file for complete search history.

(56) References Cited

FOREIGN PATENT DOCUMENTS

| | | | | |
|---|---|---|---|---|
| CN | 109535556 A | * | 3/2019 | .............. C08L 23/12 |
| CN | 113799512 A | * | 12/2021 | ............. B32B 25/14 |
| DE | 4232187 A1 | | 3/1994 | |
| GB | 2270990 A | | 3/1994 | |
| JP | 2007261120 A | | 10/2007 | |
| KR | 20180115443 A | | 10/2018 | |

OTHER PUBLICATIONS

CN-109535556-A Machine Translation (Year: 2019).*
CN113799512A Machine Translation (Year: 2021).*

* cited by examiner

*Primary Examiner* — Terressa Boykin

(74) *Attorney, Agent, or Firm* — Carmel Patent Agency; Robert Ballarini

(57) ABSTRACT

A process for treating photopolymer material that makes up master plates in flexographic printing includes:

shredding and refining the plates into pieces smaller than 10 mm in any direction;

subsequent cold grinding to obtain a powder with a particle size ranging from 100 to 500 microns;

drying the powder at a temperature of 80-120 °C for two hours;

introducing the dried powder into a twin-screw extruder with corotating screws with rotation of the screws between 150 and 250 rpm where the dried powder is mass mixed with a polymer melt at a temperature of 160-300 °C;

collecting at an exit of the extruder a homogeneous mass mixture of polymer melt and powder which is collected in the form of an extruded wire which is cooled; and pelletizing the extruded wire.

5 Claims, No Drawings

PROCESS FOR THE TREATMENT OF THE PHOTOPOLYMER MATERIAL THAT CONSTITUTES THE MATRIX PLATES IN FLEXOGRAPHIC PRINTING

INVENTIVE FIELD

The present invention relates to a process for treating the photopolymer material which forms the matrix plates in flexographic printing.

BACKGROUND

It is known that the photopolymer material which constitutes the matrix plates used in flexographic printing is a material which wears out over time or becomes outdated in order to be replaced.

Flexography is a direct rotary printing method that uses relief matrix plates made of rubber or photopolymer material called clichés.

At the end of the printing process the master plates are discarded.

This elimination involves some drawbacks and in particular:

a disposal cost, a cost of loss of material.

SUMMARY

The object of the invention is to eliminate these drawbacks and to use the matrix plates to produce a new product which has the aim of identifying a possible field of application for their recycling, such as for example a filler for common polymeric matrices.

These aims are achieved according to the invention with a treatment process of the photopolymer material which constitutes the matrix plates in flexographic printing as described in in the appended claims.

DETAILED DESCRIPTION OF THE PREFERRED EMBODIMENTS

The present invention is hereinafter further explained in a preferred embodiment thereof, given for purely exemplifying but non-limiting purposes with reference to the following description.

The process according to the invention provides for starting from a matrix plate of photopolymer material of different sizes, waste from the matrix plates used in flexographic printing, which is transformed into powder to be reused through the transformation processes of the thermoplastic polymers.

The photopolymer cliché in plate form is reduced into pieces smaller than 10 mm in each direction through a system of shredding and then refining machine.

For the reduction of the photopolymer cliché pieces into powder, the cold grinding method was used, using dry ice or nitrogen, to obtain a powder with a particle size of less than 500 microns.

The grinding into powder is performed at temperatures ranging from −35 °C to −140 °C with the cryomilling technique with the use of nitrogen and a "cryomill" machine.

The ideal grain size is from 100 to 500 microns, preferably 100-250 microns. The grinding has not compromised the original characteristics of the material.

The powder is subsequently dried at a temperature of 80-120 °C, preferably 100 °C for preferably two hours and subsequently fed into a twin-screw extruder with corotating screws with rotation of the screws between 150 RPM and 250 RPM where it is mixed in mass with polymeric melt of any thermoplastic resin, the polymeric melt/powder ratio being 80:20, at the melting temperature which can be between 160-300 °C For example, the polymer melt is based on polypropylene.

At the exit of the extruder a homogeneous mass (mixture of thermoplastic material, for example polypropylene, and the above powder intimately mixed with the polymer) was collected in the form of an extruded thread, cooled (for example in air at a temperature of 25 °C or in water at to then be pelletized in the form of granules.

From what has been said it is clear that the process according to the invention allows to obtain an additive which, when mixed with a thermoplastic resin, allows to obtain a composite which keeps the performance characteristics of the thermoplastic resin practically unchanged, thus allowing a saving of raw material, energy and thus guaranteeing the product made with the resin a lower environmental impact.

What is claimed is:

1. A process for treating photopolymer material that makes up master plates in flexographic printing, the method comprising:

shredding and refining the plates into pieces smaller than 10 mm in any direction;

subsequent cold grinding of the flexographic photopolymer plate pieces at a temperature between −35 °C and −140 °C to obtain a powder with a particle size ranging from 100 to 500 microns;

drying the powder at a temperature of 80-120 °C for two hours;

introducing the dried powder into a twin-screw extruder with co-rotating screws with rotation of the screws between 150 and 250 rpm where the dried powder is mass mixed with a polymer melt at a temperature of 160-300 °C;

collecting at an exit of the extruder a homogeneous mass mixture of polymer melt and powder which is collected in the form of an extruded wire which is cooled in air at a temperature of about 25 °C or in water at a temperature of about 15 °C; and pelletizing the extruded wire.

2. The process according to claim 1, wherein the photopolymer is ground and refined into pieces of 5 mm.

3. The process according to claim 1, wherein by cold grinding a powder is obtained with a particle size ranging from 100 to 250 microns.

4. The process according to claim 1, wherein the polymer melt is based on polypropylene.

5. The process according to claim 1, wherein the dried powder is mixed with the polymer melt in a polymer melt/powder ratio of 80:20.

* * * * *